(12) United States Patent
Civlin

(10) Patent No.: US 6,968,429 B2
(45) Date of Patent: Nov. 22, 2005

(54) METHOD AND APPARATUS FOR CONTROLLING LINE EVICTION IN A CACHE

(75) Inventor: Jan Civlin, Sunnyvale, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 435 days.

(21) Appl. No.: 10/371,790

(22) Filed: Feb. 20, 2003

(65) Prior Publication Data

US 2004/0168029 A1    Aug. 26, 2004

(51) Int. Cl.⁷ ............................................. G06F 12/12
(52) U.S. Cl. ..................... 711/133; 711/125; 711/144; 711/145; 711/156
(58) Field of Search ..................... 711/125, 133, 144, 711/145, 156

(56) References Cited

U.S. PATENT DOCUMENTS 5,732,242 A * 3/1998 Mowry ........................ 711/136
6,886,085 B1 * 4/2005 Shuf et al. ................... 711/159
6,910,107 B1 * 6/2005 Boucher ...................... 711/141

OTHER PUBLICATIONS

Kessler et al., "The Alpha 21264 Microprocessor Architecture," pp 1-6, Nov. 1999.*
Ding et al., "Improving Cache Performance in Dynamic Applications through Data and Computation Reorganization at Run Time," pp 229-241, ACM, May 1999.*
Wang et al., "Using the Compiler to Improve Cache Replacement Decisions," pp 199-208, IEEE, Sep. 2002.*

* cited by examiner

*Primary Examiner*—Stephen C. Elmore
(74) *Attorney, Agent, or Firm*—Park, Vaughan & Fleming, LLP; Edward J. Grundler

(57) ABSTRACT

One embodiment of the present invention provides a system for controlling cache line eviction. The system operates by first receiving a sequence of instructions at a processor during execution of a program, wherein the sequence of instructions causes a cache line to be loaded into the cache. Next, the system examines the sequence of instructions to determine if an associated cache line includes only scratch data that will not be reused. If so, upon loading the cache line into the cache, the system marks the cache line as containing only scratch data, which allows the cache line to be evicted next from the cache.

24 Claims, 3 Drawing Sheets

METHOD AND APPARATUS FOR CONTROLLING LINE EVICTION IN A CACHE

BACKGROUND

1. Field of the Invention

The present invention relates to techniques for improving computer system performance. More specifically, the present invention relates to a method and an apparatus for using knowledge gained during the compilation process to control cache line eviction during program execution.

2. Related Art

Advances in semiconductor fabrication technology have given rise to dramatic increases in microprocessor clock speeds. This increase in microprocessor clock speeds has not been matched by a corresponding increase in memory access speeds. Hence, the disparity between microprocessor clock speeds and memory access speeds continues to grow. This causes performance problems because microprocessor systems often spend a large fraction of time waiting for memory references to complete instead of performing computational operations.

In order to alleviate this performance problem, modern computer systems include one or more levels of faster cache memory to reduce the time required to access instructions and data. During computer system operation, when a central processing unit (CPU) requires new instructions or data, a request is sent to the cache. If the instructions or data are available within the cache, the CPU accesses them from the cache. If, however, the instructions or data are not available in the cache, a cache miss occurs, which causes a cache line containing the instructions or data to be loaded into the cache from the computer system's main memory.

When the cache is full, a cache line must be evicted from the cache prior to loading a new cache line. Many schemes are used to determine the best cache line to evict. The objective of these schemes is to evict the cache line that will not be needed for the greatest amount of time. Most computer systems use a variation of the least recently used (LRU) replacement scheme, which evicts the cache line that is "least recently used." The LRU replacement scheme generally works because accesses to instructions and data tend to exhibit a large amount of temporal locality. This means that more recently accessed instructions and data are most likely to be accessed again.

However, the LRU replacement scheme does not work well when a cache line containing only scratch data (that will be used only once) is loaded into the cache. In these cases, the computer system has no way of knowing that the data will be used only once and will never be accessed again. However, an LRU eviction scheme will retain the cache line containing scratch data until it becomes the least recently used cache line, and will instead evict other cache lines containing data that will be accessed again, thereby decreasing system performance.

Hence, what is needed is a method and apparatus for controlling cache line eviction without the problems described above.

SUMMARY

One embodiment of the present invention provides a system for controlling cache line eviction. The system operates by first receiving a sequence of instructions at a processor during execution of a program, wherein the sequence of instructions causes a cache line to be loaded into the cache. Next, the system examines the sequence of instructions to determine if an associated cache line includes only scratch data that will not be reused. If so, upon loading the cache line into the cache, the system marks the cache line as containing only scratch data, which allows the cache line to be evicted next from the cache.

In a variation on this embodiment, the system receives source code for a computer program at a compiler, which compiles the source code into executable code. During the compilation process, the compiler examines the executable code to locate a sequence of instructions that operates on only scratch data. Upon locating such a sequence of instructions, the compiler marks the sequence of instructions to indicate that the cache line associated with the sequence of instructions includes only scratch data.

In a further variation, marking the sequence of instructions involves setting a bit within an instruction in the sequence of instructions.

In a further variation, marking the sequence of instructions involves including an annotation with the executable code, wherein the annotation indicates that specific instructions cause associated cache lines to be marked.

In a further variation, marking the sequence of instructions involves inserting special instructions that cause associated cache lines to be marked into the executable code.

In a variation on this embodiment, marking the cache line involves marking the cache line as containing only scratch data upon loading the cache line into the cache, and subsequently marking the cache line as dead after accessing the loaded cache line.

In a variation on this embodiment, marking the cache line involves changing state information associated with the cache line, wherein the state information indicates an LRU ordering for the cache line.

In a variation on this embodiment, marking the cache line involves setting one or more marking bits in the cache line.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as the Internet.

Compiler

Figure 1:
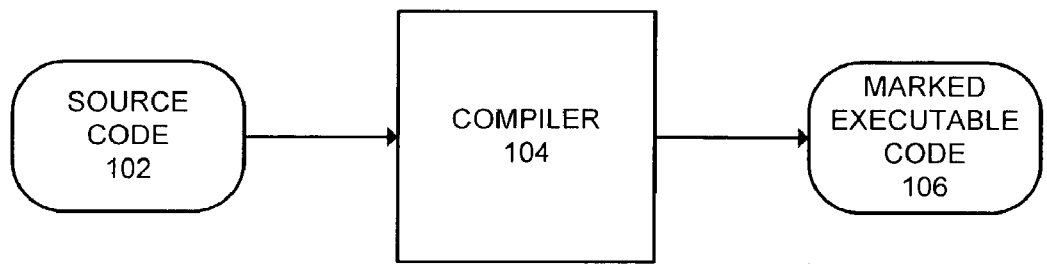
FIG. 1 illustrates a compiler in accordance with an embodiment of the present invention.

FIG. 1. illustrates a compiler 104 in accordance with an embodiment of the present invention. During operation, compiler 104 receives source code 102 for a computer program. Note that source code 102 can be written in any type of higher-level programming language. Compiler 104 compiles source code 102 to produce marked executable code 106.

During the compilation process, after executable code has been generated for the computer program, compiler 104 examines the executable code to identify sequences of instructions that operate on only scratch data. Compiler 104 then marks these sequences of instructions to produce marked executable code 106. Marked executable code 106 is then ready to be executed by the computer system.

Computer

Figure 2:
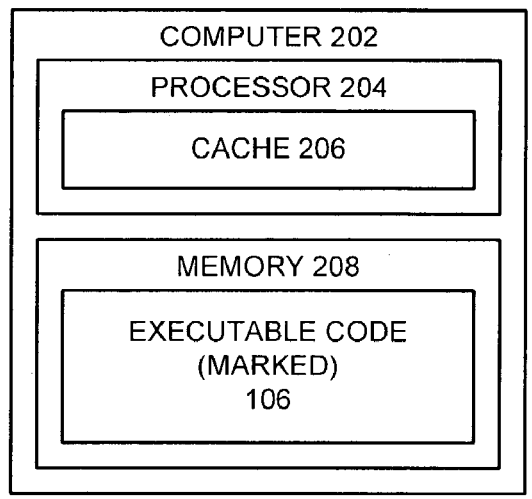
FIG. 2 illustrates a computer in accordance with an embodiment of the present invention.

FIG. 2 illustrates a computer 202 in accordance with an embodiment of the present invention. Computer 202 can generally include any type of computer system, including, but not limited to, a computer system based on a microprocessor, a mainframe computer, a digital signal processor, a portable computing device, a personal organizer, a device controller, and a computational engine within an appliance. Computer 202 includes processor 204 and memory 208.

Processor 204 includes cache 206, which includes very high-speed memory for storing instructions and data that are likely to be accessed during program execution.

Although FIG. 2 illustrates a single cache 206, the present invention can generally be applied to many different types of caches. For example, the present invention can be applied to separate instruction and data cache, as well as multi-level caches that include level 1 (L1) and level 2 (L2) caches. Also note also that cache 206 may be located externally to processor 204. The structure of cache 206 is described in more detail in conjunction with FIG. 3 below.

Memory 208 provides storage for instructions and data associated with programs to be executed by processor 204. More specifically, marked executable code 106 (generated by compiler 104) can be stored in memory 208 and can provide instructions to be executed by processor 204.

Cache Memory

Figure 3:
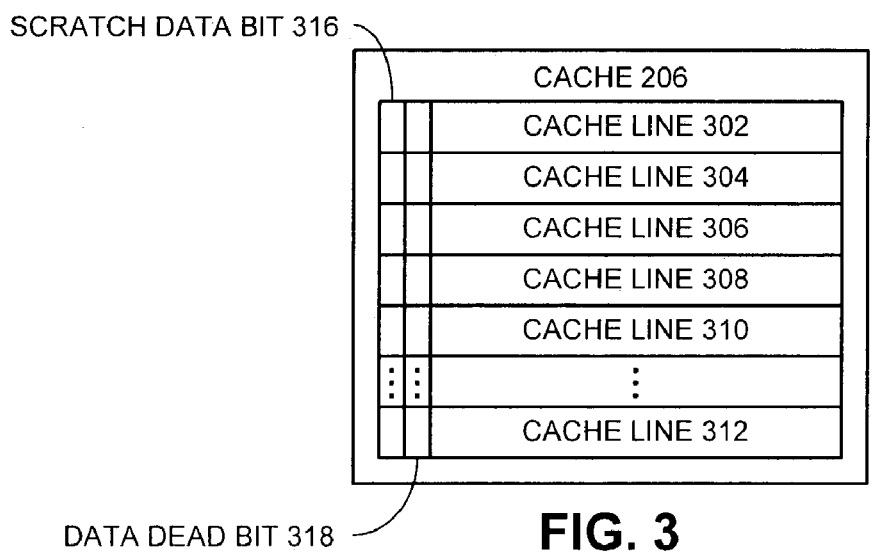
FIG. 3 illustrates a cache in accordance with an embodiment of the present invention.

FIG. 3 illustrates the structure of cache 206 in accordance with an embodiment of the present invention. Cache 206 includes cache lines 302, 304, 306, 308, 310, and 312. In addition to standard tag bits and data bits, each cache line includes an associated scratch data bit 316 and data dead bit 318.

During operation, a cache line, say cache line 308, is loaded into cache 206 from main memory or from a lower level cache. Upon loading cache line 308, processor 204 determines if the sequence of instructions that caused the cache line to be loaded is marked to indicate that the cache line includes only scratch data. If so, processor 204 sets the scratch data bit 316 associated with cache line 308. After using the scratch data in cache line 308, processor 204 sets the data dead bit 318 associated with cache line 308 to indicate that the cache line will not be accessed again.

During subsequent processing, when processor 204 needs to evict a cache line from cache 206 to make room for another cache line, processor 204 first examines cache 206 to locate cache lines with both scratch data bit 316 and data dead bit 318 both set. If both bits are set, the associated cache line is available for immediate eviction. Evicting these "dead" cache lines prevents unneeded eviction of cache lines that is still in use. If no cache line is located with both bits set, processor 204 resorts to a default eviction scheme, such as LRU. Note that if the cache is a set-associative cache, the LRU scheme applies only to cache lines within a specific "set" associated with the memory operation. (This set is determined by index bits of an address for the memory operation.)

Marking Sequences of Code

Figure 4:
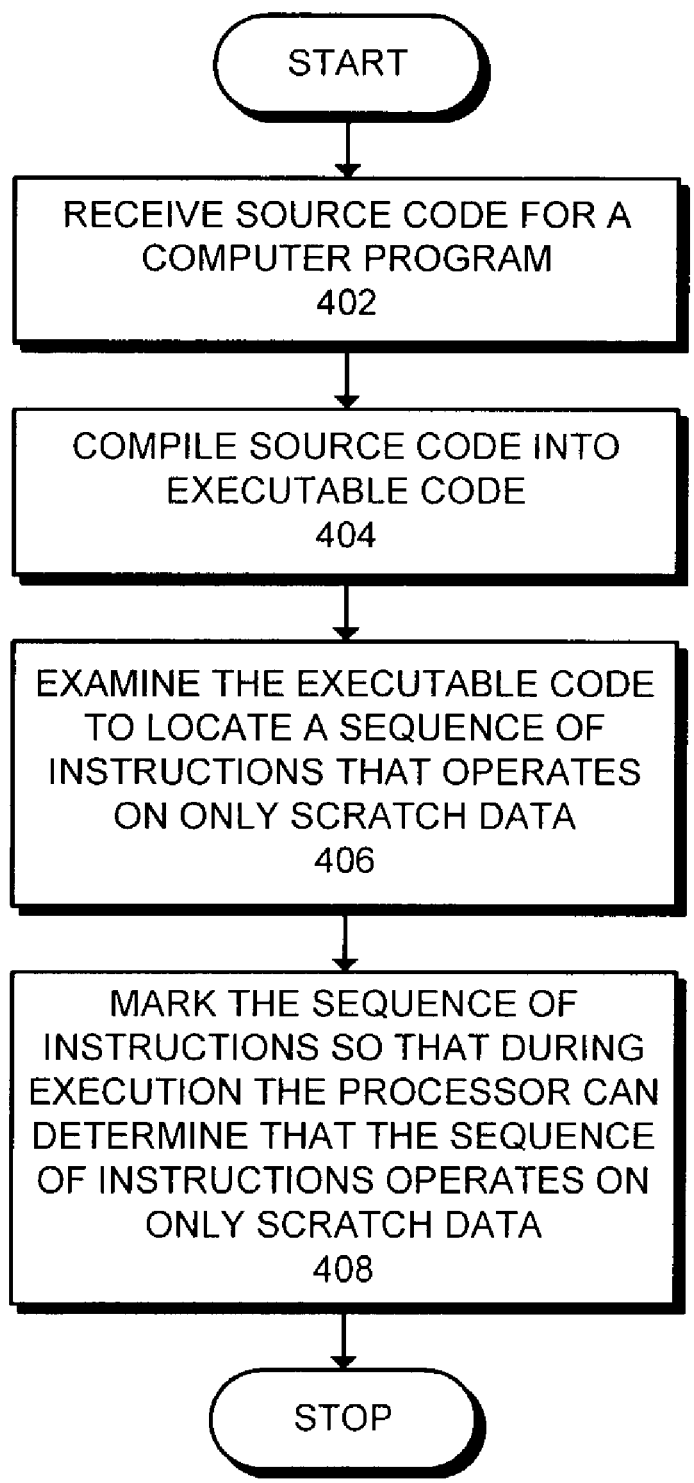
FIG. 4 presents a flowchart illustrating the process of marking code sequences that operate only on scratch data in accordance with an embodiment of the present invention.

FIG. 4 presents a flowchart illustrating the process of marking sequences of instructions that operate only on scratch data in accordance with an embodiment of the present invention. The system starts when source code for a computer program is received at a compiler (step 402). Next, the compiler compiles the source code into an executable code (step 404).

During the compilation process, after the executable code is generated, the compiler examines the executable code to locate sequences of instructions that operate on only scratch data (step 406). For example, consider the following sequence of instructions.

load r3←mem1 inc r3 store r3→mem1

This sequence of instructions accesses the cache line containing mem1 twice: first to load mem1 into r3; and then to store the incremented value in r3 back to mem1. After the store operation completes, the compiler can determine that mem1 is not accessed again within the same function, which means that the cache line containing r3 includes only scratch data. Note that although reuse analysis can be performed at the function level, the present invention can also be applied to systems that perform reuse analysis across functions.

In another example, after a function completes, all cache lines containing stack locations for the function can be marked as "dead" because the stack locations will not be accessed again.

Upon locating a sequence of instructions that operates only on scratch data, the compiler marks the sequence of instructions (step 408).

Marking Cache Lines

Figure 5:
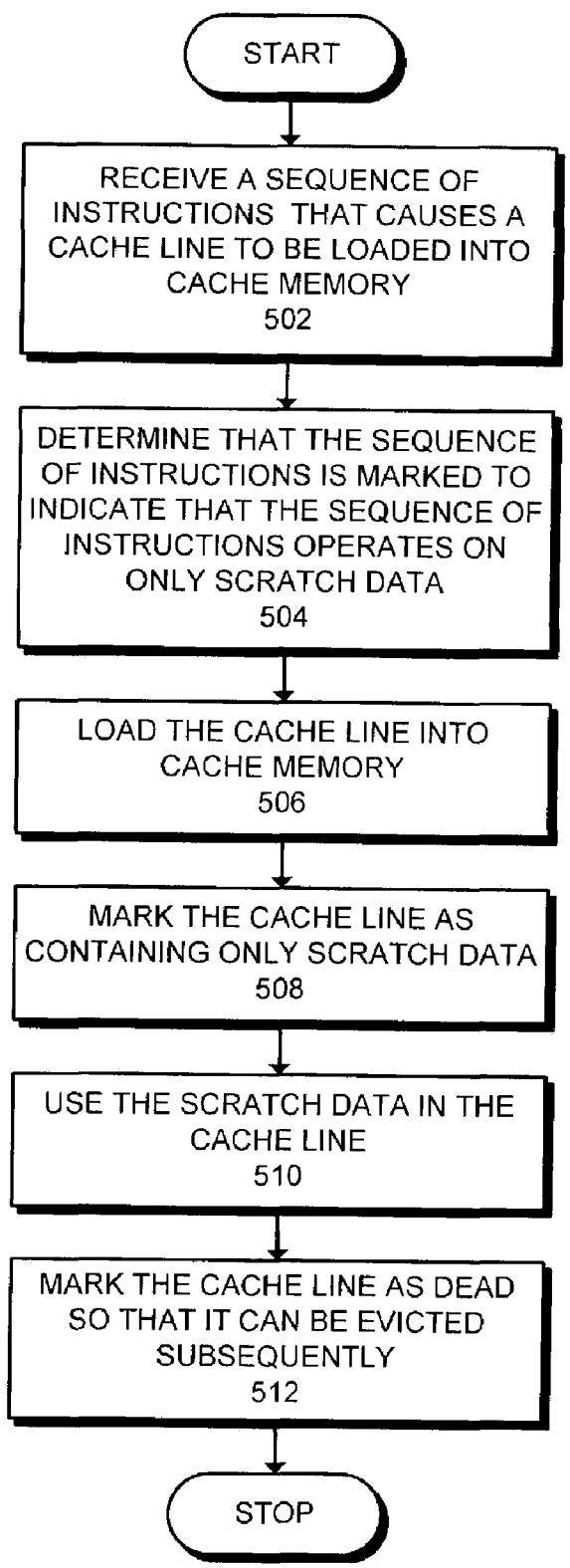
FIG. 5 presents a flowchart illustrating the process of marking cache lines that contain only scratch data in accordance with an embodiment of the present invention.

FIG. 5 presents a flowchart illustrating the process of marking cache lines that include only scratch data in accordance with an embodiment of the present invention. The system starts when the processor receives a sequence of instructions that cause a cache line to be loaded into cache memory (step 502). Next, the processor examines the sequence of instructions to determine if the sequence of instructions is marked to indicate that the sequence of instructions operates on only scratch data (step 504). If so, the processor then loads the cache line into cache memory (step 506). If the cache line includes only scratch data, the processor marks the cache line as containing only scratch data (step 508).

The processor then accesses the scratch data in the cache line (step 510). Finally, after the scratch data has been accessed, the processor marks the cache line as "dead" so that the cache line can be evicted next (step 512). Note that instead of marking both a scratch data bit and a dead data bit as described above, another embodiment of the present invention simply changes state information in the cache line, which indicates an LRU ordering for the cache line. This state information is modified to indicate that the cache line containing the scratch data is least recently used.

During a subsequent cache line eviction operation, the processor attempts to first evict cache lines having both the scratch data bit set and the dead data bit set. If no such cache line can be located, the system reverts to the standard cache replacement policy.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for controlling line eviction in a cache, comprising:
   receiving a sequence of instructions at a processor during execution of a computer program, wherein the sequence of instructions causes a cache line to be loaded into the cache;
   examining the sequence of instructions to determine if an associated cache line includes only scratch data that will not be reused; and
   if so, marking the associated cache line as containing only scratch data, whereby marking the cache line allows immediate eviction of the cache line from the cache.

2. The method of claim 1, further comprising:
   receiving source code for the computer program at a compiler;
   compiling the source code into an executable code;
   during the compilation process, examining the executable code to locate a sequence of instructions that operates on only scratch data; and
   if such a sequence is located, marking the sequence of instructions to indicate that the cache line associated with the sequence of instructions includes only scratch data.

3. The method of claim 2, wherein marking the sequence of instructions involves setting a bit within an instruction in the sequence of instructions.

4. The method of claim 2, wherein marking the sequence of instructions involves including an annotation with the executable code, wherein the annotation indicates that specific instructions cause associated cache lines to be marked.

5. The method of claim 2, wherein marking the sequence of instructions involves inserting special instructions into the executable code that cause associated cache lines to be marked.

6. The method of claim 1, wherein marking the cache line involves marking the cache line as containing only scratch data upon loading the cache line, and subsequently marking the cache line as dead after accessing the loaded cache line.

7. The method of claim 1, wherein marking the cache line involves changing state information associated with the cache line, wherein the state information indicates an LRU ordering for the cache line.

8. The method of claim 1, wherein marking the cache line involves setting one or more marking bits in the cache line.

9. An apparatus for controlling line eviction in a cache, comprising:
   a receiving mechanism configured to receive a sequence of instructions at a processor during execution of a computer program, wherein the sequence of instructions causes a cache line to be loaded into the cache;
   an examining mechanism configured to examine the sequence of instructions to determine if an associated cache line includes only scratch data that will not be reused; and
   a marking mechanism configured to mark the associated cache line as containing only scratch data if the associated cache line includes only scratch data that will not be reused, whereby marking the cache line allows immediate eviction of the cache line from the cache.

10. The apparatus of claim 9, further comprising:
    a source code receiving mechanism configured to receive source code for the computer program at a compiler;
    a compiling mechanism configured to compile the source code into an executable code;
    an executable code examining mechanism configured to examine the executable code to locate a sequence of instructions that operates on only scratch data during the compilation process; and
    an executable code marking mechanism configured to mark the sequence of instructions to indicate that the cache line associated with the sequence of instructions includes only scratch data if such a sequence is located.

11. The apparatus of claim 10, wherein marking the sequence of instructions involves setting a bit within an instruction in the sequence of instructions.

12. The apparatus of claim 10, wherein marking the sequence of instructions involves including an annotation with the executable code, wherein the annotation indicates that specific instructions cause associated cache lines to be marked.

13. The apparatus of claim 10, wherein marking the sequence of instructions involves inserting special instructions into the executable code that cause associated cache lines to be marked.

14. The apparatus of claim 9, wherein marking the cache line involves marking the cache line as containing only scratch data upon loading the cache line, and subsequently marking the cache line as dead after accessing the loaded cache line.

15. The apparatus of claim 9, wherein marking the cache line involves changing state information associated with the cache line, wherein the state information indicates an LRU ordering for the cache line.

16. The apparatus of claim 9, wherein marking the cache line involves setting one or more marking bits in the cache line.

17. A means for controlling line eviction in a cache, comprising:
    a means for receiving a sequence of instructions at a processor during execution of a computer program, wherein the sequence of instructions causes a cache line to be loaded into the cache;
    a means for examining the sequence of instructions to determine if an associated cache line includes only scratch data that will not be reused; and
    a means for marking the associated cache line as containing only scratch data if the associated cache line includes only scratch data that will not be reused, whereby marking the cache line allows immediate eviction of the cache line from the cache.

18. The means of claim 17, further comprising:
- a means for receiving source code for the computer program at a compiler;
- a means for compiling the source code into an executable code;
- a means for examining the executable code to locate a sequence of instructions that operates on only scratch data during the compilation process; and
- a means for marking the sequence of instructions to indicate that the cache line associated with the sequence of instructions includes only scratch data if such a sequence is located.

19. The means of claim 18, wherein marking the sequence of instructions involves setting a bit within an instruction in the sequence of instructions.

20. The means of claim 18, wherein marking the sequence of instructions involves including an annotation with the executable code, wherein the annotation indicates that specific instructions cause associated cache lines to be marked.

21. The means of claim 18, wherein marking the sequence of instructions involves inserting special instructions into the executable code that cause associated cache lines to be marked.

22. The means of claim 17, wherein marking the cache line involves marking the cache line as containing only scratch data upon loading the cache line, and subsequently marking the cache line as dead after accessing the loaded cache line.

23. The means of claim 17, wherein marking the cache line involves changing state information associated with the cache line, wherein the state information indicates an LRU ordering for the cache line.

24. The means of claim 17, wherein marking the cache line involves setting one or more marking bits in the cache line.

* * * * *